United States Patent [19]

Hawkins et al.

[11] Patent Number: 4,994,532

[45] Date of Patent: Feb. 19, 1991

[54] POLYCARBONATE-SILICONE BLOCK COPOLYMER COMPOSITIONS

[75] Inventors: Christopher M. Hawkins, Evansville; Robert R. Gallucci, Mt. Vernon, both of Ind.

[73] Assignee: General Electric Company, Mt. Vernon, Ind.

[21] Appl. No.: 367,417

[22] Filed: Jun. 16, 1989

[51] Int. Cl.$^5$ .......................................... C08F 283/02
[52] U.S. Cl. ...................................... 525/464; 528/26; 528/41
[58] Field of Search ...................... 525/464; 528/26, 41

[56] References Cited

U.S. PATENT DOCUMENTS 4,393,156 7/1983 Miller ................................. 524/107
4,393,158 7/1983 Miller ................................. 525/467

*Primary Examiner*—Melvyn I. Marquis
*Attorney, Agent, or Firm*—Martin B. Barancik; Joseph T. Eisele

[57] ABSTRACT

Carboxylic acid functionalized polydimethylsiloxane fluids react with polycarbonate in the melt to form polydimethylsiloxane/polycarbonate block copolymers. The resultant copolymers are transparent and show improved flow and thick section impact relative to the polycarbonate.

6 Claims, No Drawings

POLYCARBONATE-SILICONE BLOCK COPOLYMER COMPOSITIONS

BACKGROUND OF THE INVENTION

1. Field of the Invention

The invention relates to thermoplastic resin compositions and more particularly relates to polycarbonate-silicone block copolymers and methods of their preparation.

2. Brief Description of the Prior Art

Polycarbonate-silicone copolymers have found valuable usage as coatings and adhesives for bonding laminate structures; see for example the description found in U.S. Pat. No. 4,123,588 (Molari, Jr.) issued Oct. 31, 1978. Polycarbonate-silicone copolymers are also useful as components of thermoplastic molding compositions; see U.S. Pat. No. 4,569,970 (Paul et al) issued Feb. 11, 1986.

Elastomer compositions are described in U.S. Pat. No. 4,387,193 (Giles, Jr.) which issued June 7, 1983. These elastomer compositions include polycarbonate-silicone block copolymers as a blend component. Other preparations are described in U.S. Pat. No. 3,189,662 (Vaughn) issued June, 1965.

In general, the known polycarbonate-silicone block copolymers are prepared by solution polymerization techniques. We have discovered that polycarbonate-silicone copolymers may also be prepared by melt blending a polycarbonate with a silicone bearing carboxylic acid functionality. The transesterification reaction which occurs may be carried out in conventional melt extrusion equipment, an advantage over the more complex solution polymerization technique. The resulting block copolymer exhibits unexpected physical properties, which enhance flow and thick section impact values compared to values obtained in unmodified polycarbonate. Additionally, transparency is obtained in articles molded from a blend of a polycarbonate with a functionalized silicone.

SUMMARY OF THE INVENTION

The invention comprises a method of preparing a polycarbonate-silicone block copolymer, which comprises;

melt blending together
(A) an aromatic polycarbonate resin; and
(B) a polydiorganosiloxane having at least one functional carboxylic acid group.

The invention also comprises the block-copolymers produced by the method of the invention. The block-copolymers are useful in the fabrication of coatings, membranes, thermoplastically molded articles and as impact-modifiers in thermoplastic resin molding compositions and as adhesives.

The term "melt blending" as used herein means a homogeneous admixturing of the polycarbonate resin and the polydiorganosiloxane while they are in a molten or thermoplastic state, i.e., heated to a condition of plasticity whereupon the resins will flow like a fluid. Advantageously, the temperature is within a range to cause reaction between the polycarbonate and the acid groups on the polydiorganosiloxane, generally a range of from about 300°C. to 400°C., preferably 325°C. to 350°C.

DETAILED DESCRIPTION OF THE PREFERRED EMBODIMENTS OF THE INVENTION

The aromatic polycarbonate resins employed in the method and compositions of the invention are well known. Generally speaking, such carbonate polymers may be typified as possessing recurring structural units of the formula:

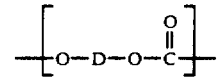

wherein D is a divalent aromatic radical of the dihydric phenol employed in the polymerization reaction. Preferably, the polycarbonate polymers used to provide the resinous compositions of the invention have an intrinsic viscosity (as measured in methylene chloride at 25°C.) ranging from about 0.70 to about 1.45 dl/g. In general, the higher viscosity polycarbonates are preferred. The dihydric phenols which may be employed to provide such aromatic carbonated polymers are mononuclear or polynuclear aromatic compounds, containing as functional groups two hydroxy radicals, each of which is attached directly to a carbon atom of an aromatic nucleus. The preferred polycarbonate resin for use herein is a homopolymer derived from 2,2-bis-(4-hydroxyphenyl) propane and a carbonate precursor.

The aromatic polycarbonates may be manufactured by known processes, such as the methods set forth in U.S. Pat. Nos. 4,018,750 and 4,123,436 where a dihydric phenol is reacted with a carbonate precursor; or by transesterification processes such as are disclosed in U.S. Pat. No. 3,154,008, as well as other processes known to those skilled in the art. The preferred method of preparing polycarbonate resins comprises the interfacial polymerization of a dihydric phenol with a carbonate precursor.

Typical dihydric phenols useful in formulating the polycarbonate resins, as described above, may be represented by the general formula:

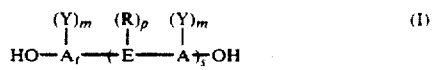

in which A is an aromatic group such as phenylene, biphenylene, naphthalene, anthrylen; E may be an alkylene or alkylidene group such as isopropylidene, butylene, butylidene, isobutylidene, amylene, isomaylene, amylidene, isoamylidene, and generally from one to twelve carbon atoms, inclusive. Where E is an alkylene or alkylidene group, it may also consist of two or more alkylene or alkylidene groups, connected by non-alkylene or non-alkylidene groups, connected by a non-alkylene or non-alkylidene group, such as an aromatic linkage, a tertiary amino linkage, an ether linkage, a carbonyl linkage, or by a sulfur-containing linkage such as sulfide, sulfoxide or sulfone. In addition, E may be a cycloaliphatic group of five to twelve carbon atoms, inclusive (e.g. cyclopentyl, cyclohexyl), or a cycloalkylidene of five to seven carbon atoms, inclusive, such as cyclohexylidene; a sulfur-containing linkage, such as sulfide, sulfoxide or sulfone; an ether linkage; a carbonyl group; a direct bond; or a tertiary nitrogen group. Other groups which E may represent will occur to those skilled in the art. R is hydrogen or a monovalent hydrocarbon group such as alkyl of one to eight carbon atoms, inclusive (methyl ethyl, propyl); aryl (phenyl, naphthyl); aralkyl (benzyl, ethylphenyl,; or cycloaliphatic of five to seven carbon atoms, inclusive (cyclopentyl, cyclohexyl). Y may be an inorganic atom such as chlorine, bromine, fluorine; an organic group such as the nitro group; an organic group such as R above; or an oxy group such as OR, it being only necessary that Y be inert to an unaffected by the reactants and the reaction conditions. The letter m is any whole number from and including zero through the number of positions on A available for substitution; p is any whole number from and including zero through the number of available positions on E; t is a whole number equal to at least one; and s is any whole number from and including zero to twenty.

In the typical dihydric phenol compound represented by Formula I above, when more than one Y substituent is present, they may be the same or different. The same is true for the R substituent. Where s is greater than one, E can be the same or different. Where E is a direct bond, the aromatic rings are directly joined with no intervening alkylene or other bridge. The positions of the hydroxyl groups and Y on the aromatic nuclear residues, A, can be varied in the ortho, meta, or para positions; and the groupings can be in a vicinal, nonsymmetrical or symmetrical relationship, where two or more ring carbon atoms of the aromatic hydrocarbon residu are substituted with Y and a hydroxyl group.

Examples of dihydric phenol compounds that may be employed in the above polymers include:
2,2-bis-(4-hydroxyphenyl)propane (or bisphenol-A);
2,4'-dihydroxydiphenyl methane;
bis-(2-hydroxyphenyl) methane;
bis-(4-hydroxyphenyl) methane;
bis-(4-hydroxy-5-nitrophenyl) methane;
bis-(4-hydroxy-2,6-dimethyl-3-methoxyphenyl)methane;
1,1-bis-(4-hydroxyphenyl) ethane;
1,2-bis-(4-hydroxphenyl)ethane;
1,1-bis-(4-hydroxy-2-chlorophenyl) ethane;
1,1-bis-(2,5-dimethyl-4-hydroxyphenyl) ethane;
1,3-bis-(3-methyl-4-hydroxyphenyl) propane;
2,2-bis-(3-phenyl-4-hydroxyphenyl) propane;
2,2-bis-(3-isopropyl-4-hydroxyphenyl) propane;
2,2-bis-(4-hydroxyphenyl) propane;
2,2-bis-(4-hydroxyphenyl) pentane;
3,3-bis-(4-hydroxyphenyl) pentane;
2,2-bis-(4-hydroxyphenyl) heptane;
bis-(4-hydroxyphenyl) phenylmethane;
bis-(4-hydroxyphenyl) cyclohexymethane;
1,2-bis-(4-hydroxyphenyl)-1,2-bis-(Phenyl) propane;
2,2-bis-(4-hydroxyphenyl)-1-phenylpropane; and the like.

Also included are dihydroxybenzenes typified by hydroquinone and resorcinol; dihydroxybiphenyls such as 4,4'-dihydroxybiphenyl; 2,2' dihydroxybiphenyl; 2,4'-dihydroxybiphenyl; dihydroxynaphthalenes such as 2,6-dihydroxynaphthalene.

Also useful are dihydric phenols wherein E is a sulfur-containing radical such as the dihydroxy aryl sulfones exemplified by bis-(4-hydroxyphenyl) sulfone;
0 2,4'-dihydroxydiphenyl sulfone;
bis-(3,5-dimethyl-4-hydroxyphenyl) sulfone;
5'-chloro-2,4'-dihydroxydiphenyl sulfone;
3-chloro-bis-(4-hydroxyphenyl) sulfone; and 4,4' dihydroxytriphenyldisulfone.

The preparation of these and other useful sulfones are described in U.S. Pat. No. 2,288,282. Hydroxy terminated polysulfones as well as substituted sulfones using halogen, nitrogen, alkyl radicals, are also useful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative os such compounds are the following:
4,4'-dihydroxydiphenyl ether;
4,4'-dihydroxytriphenyl ether; the 4,3'-, 4,2'-, 4,1'-, 2,2'-, 2,3'-dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
6,6'-dihydroxydinaphthyl-2,2'-ether;
6,6'-dihydroxy-5,5'-dichlorodinaphthyl-2,2' ether;
4,4'-dihydroxypentaphenyl ether;
4,4'-dihydroxy-2,6-dimethoxydiphenyl ether; and
4,4-dihydroxy-2,5-diethoxydiphenyl ether.

Mixtures of the dihydric phenols can also be employed, and where dihydric phenol is mentioned herein, mixtures of such materials are considered to be included. Other dihydric phenols which are suitable are disclosed in U.S. Pat. Nos. 2,999,835; 3,028,365; 3,334,154; 4,131,575.

The carbonate precursor used to produce the polycarbonate resins may be either a carbonyl halide, a carbonate ester, or a haloformate. Typical of the carbonate esters are diphenyl carbonate, di (halophenyl) carbonates such as di (chloropeenyl) carbonate, di (bromophenyl) carbonate, di (trichlorophenyl) carbonate, di (tribromophenyl) carbonate, di (alkylphenyl) carbonate such as di (tolyl) carbonate, phenyltolyl carbonate, chloronaphthyl chlorophenyl carbonate, and the like. The haloformates suitable for use herein include bishaloformates of dihydric phenols such as bischloroformates of hydroquinone, or glycols such as bis-haloformates of ethylene glycol, neopentyl glycol or polyethylene glycol. While other carbonate precursors will occur to those skilled in the art, carbonyl chloride, also know as phosgene, is preferred.

Included within the term "polycarbonates", for the purposes of this invention are the poly(estercarbonate) resins. These resins may generally be described as polymers comprising recurring carbonate groups,

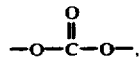

carboxylate groups,

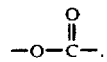

and aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) polymers, in general, are prepared by reacting an aromatic difunctional carboxylic acid or ester forming derivative, a dihydric phenol and a carbonate precursor.

The preparation of poly(ester-carbonates) which may be employed in the compositions of the present invention is described in U.S. Pat. Nos. 3,030,331; 3,169,121; 3,207,814; 4,194,038 and 4,156,069 incorporated herein by reference.

The poly(ester-carbonates) which are preferred in the practice of the present invention include the aromatic poly(ester-carbonates) derived from dihydric phenols, aromatic dicarboxylic acids or their reactive ester forming derivatives such as the aromatic diacid halides, and phosgene. The aromatic difnnctional carboxylic acids suitable for producing poly (estercarbonates) may be represented by the general formula:

HOOC—B—COOH (II)

wherein B represents an aromatic radical such as phenylene, naphthalene, biphenylene, substituted phenylene; two or more aromatic groups connected through non-aromatic linkages such as those defined by E in Formula I; or a divalent aliphatic-aromatic hydrocarbon radical such as an aralkyl or alkaryl radical. For purposes of the present invention, the aromatic dicarboxylic acids or their reactive derivatives such as, for example, the acid halides or diphenyl esters, are preferred. Thus, in the preferred aromatic difunctional carboxylic acids, as represented by Formula II, B is an aromatic radical such as phenylene, biphenylene, naphthalene, substituted phenylene, etc. Some nonlimiting examples of some aromatic dicarboxylic acids which may be used in preparing the poly (ester-carbonate) of the instant invention include phthalic acid, isophthalic acid, terephthalic acid, o-, m-, and p-phenylendediacetic acid, and the polynuclear aromatic acids such as diphenyl dicarboxylic acids, and isomeric naphthalene dicarboxylic acids. The aromatics may be substituted with Y groups in the same manner as the Formula I aromatics are substituted. Of course, these acids may be used individually or as mixtures of two or more different acids. A particularly useful class of aromatic poly (ester-carbonates) is that derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of ester units in the poly(ester-carbonate) is generally from about 25 to 90 mole percent and preferably about 35 to 80 mole percent. The molar range of terephthalate units, with the remainder of the copolymer ester units preferably comprising isophthalate units, is generally from about 2 to about 90 percent, and preferably from about 5 to about 50 percent.

Silicones employed in the method and the compositions of the invention are a class of polymers having the generic formula:

$$(R_pSiO_{(4-p)/2})_m \quad (III)$$

wherein p is an integer of 1 to 3 and m is 2 or more. R, which is attached to a significant proportion of the silicon atoms by silicon-carbon bonds represents a monovalent organic moiety such as alkyl, halogen-substituted alkyl, aryl and alkenyl Other groups which may be attached to the silicon include hydrogen, hydroxy, mercapto and the like. Silicones are well known polymers as are methods of their manufacture; see for example the methods described in the Kirk-Othmer Encyclopedia of Chemical Technology, Second Edition, Vol. 18, pgs 221-260 and in U.S. Pat. No. 3,419,634; all of which are incorporated herein by reference thereto.

The silicones employed in the method of the present invention to prepare polycarbonate-silicpne block copolymers bear at least one and preferably two carboxylic acid groups on a single silicone chain. The acid groups may be positioned at a chain terminus or at a chain site between the terminal ends. The carboxylic acid group is connected to the silicon atom through at least one or more carbon atoms. Examples of carboxylic acid groups attached to the silicone include, ethyl carboxy, propyl carboxy, cyclohexyl carboxy, phenyl carboxy, ethylphenyl carboxy, propylphthalimide carboxy and the like. It should also be noted that the silicone resin can be endcapped with the aforementioned functional groups. Representative of the silicones advantageously employed in preparing the compositions of the invention are arylalkylcarboxylic acid chain-stopped polydiorganosiloxanes composed of from about 3 to 1,000 chemically combined diorganosiloxy units consisting essentially of dialkylsilicon units which are connected to each other by silicon-oxygen-silicon linkages wherein each of the silicon atoms has two organo radicals attached through a carbon-silicon bond. A preferred silicone employed in the method of the invention is a preparation by reaction of trimelletic anhydride (TMA) with a gamma amino propyl endcapped silicon (GAP) fluid with a polydimethylsiloxane (PDMS) block length of "n". As an example, there is a preferred class of polymer represented by the formula:

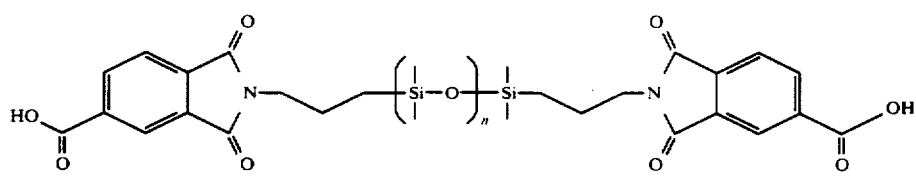

wherein n is a positive inteqer of at least 1 up to about 1,000 which includes a range of from 4 to about 40. For convenience, the polymers of formula (IV) may be referred to schematically as "$G_nTMA$" wherein n is a whole number of 1 to about 1,000. Additionally, carboxylic acid functionalized silicones may be prepared by peroxide promoted reaction of an unsaturated carboxylic acid or ester with a silane (Si—H) containing silicone; by platinum catalyzed addition of alkenyl nitriles to silane containing silicones followed by hydrolysis of the nitrile group to yield the carboxylic acid or by other methods known to those skilled in the art.

Forming the compositions of this invention may be accomplished by any conventional melt blending technique. Melt blending may be accomplished in a conventional thermoplastic extruder, from which the admixture may be molded into an article of specific dimensions or extruded to obtain a film or sheet product.

In the melt blending procedure, advantageously employed in the method of the invention, the polycarbonate resin and the silicone resin are simply heated to a melt temperature and admixed. The silicone fluid and the polycarbonate resin may be pre-mixed by dissolving them in an appropriate solvent such as methylene chloride, and then allowing the solvent to evaporate off before or during melt blending. Alternatively the silicone and polycarbonate resin may be preblended in powder, pellet or liquid form. It is also possible to introduce the silicone fluid into a polycarbonate melt. A residence time at melt blending temperatures is needed, of sufficient length to achieve the desired reaction. The extent of reaction between the carboxylic acid functionalized silicone and polycarbonate resin will depend on the exact structure of each component, the method and temperature of contact and the length of time the resins are in contact. Generally best results are achieved with intensive melt mixing at 325-375.C. for 1-5 min. Care must be taken to avoid temperatures which can substantially decompose the reactants or products.

The product of the reaction may be extruded into usable forms such as sheets or pellets for later molding or may be molded directly after melt blending, into desired articles of commerce. Conventional analysis of the product ('H NMR) may be used to determine the percentage of polydimethylsiloxane in the copolymer product, when so desired.

Although we are not to be bound by any theory of operation, we believe that during the reaction which occurs during melt blending according to the method of the invention a small portion of the silicon fluid may be incorporated into the product in a rearranged form, resulting in some advantageous physical properties. The melt blended compositions of the invention may contain other ingredients such as stabilizers, flame retardants, mold release agents, foaming agents, reinforcing agents, pigments, and other thermoplastic resins. Examples of other thermoplastic resins include polyesters, polyphenylene ethers, polyimides and the like. Also included are fillers and reinforcing fibers such as, for example, glass and carbon. The fillers may include, for example, silica, talc, clay, mica, calcium sulfate and calcium carbonate. The amount of additive present is dependent upon the desired effect and it is within the knowledge of those skilled in the art to determine the appropriate amounts.

On a weight basis the polycarbonate and the polydiorganosiloxane may be widely varied and within weight ratios of from 1:99 to 99:1. The specific proportions selected will of course be reflected in the physical properties of the block copolymers of the invention. As the proportion of siloxane blocks increases, so will the flexability and elasticity of products molded from the compositions. The preferred range of composition is 1-50 wt. percent silicone. The most preferred range is 1-10 wt. percent silicone.

The final use of the siloxane copolymer will reflect the range composition and the molecular weight of the components employed. For stiff, high impact injection molding application it is advantageous to use a high molecular weight polycarbonate resin (intrinsic viscosity 0.8 dl/g measured at 25.C. in methylene chloride solution).

The following examples describe the manner and the process of making and using the invention and set forth the best mode contemplated by the inventor for carrying out the invention but is not to be construed as limiting. Where indicated the following test procedures were carried out.

Tensile Strength, Modulus and Elongation:
According to the ASTM test method D-638.
Notched Izod Impact Strength (NI):
According to the ASTM test method D-256. All specimens were 100% ductile at failure.
Flexural Strength
According to ASTM test method D-790.
Intrinsic viscosity (I.V.)
Intrinsic viscosity analyses were performed in methylene chloride at 25°C.
Kasha Index (KI)

The procedure for determining the Kasha Index is as follows: 7 grams of resin pellets, dried a minimum of 90 minutes at 125°C. are added to a modified Tinius-Olsen T3 melt indexer; the temperature in the indexer is maintained at 300 C and the resin is heated at this temperature for 6 minutes; after 6 minutes the resin is forced through a 1.05 mm radius orifice using a plunger of radius 4.7 mm and an applied force of 7.7 kgs; the time required for the plunger to travel 5.1 cm is measured in centiseconds and this is reported as the Kasha Index (KI).

Percentage of PDMS Calculations

Calculations of percentage of polydimethylsiloxane (PDMS) in the polycarbonate/PDMS copolymers is determined using proton NMR as follows:

$$\text{wt \% PDMS} = \frac{\text{moles GnTMA} \times \text{FW PDMS block in GnTMA}}{\text{moles PC} \times 254 \text{ g/mole} + \text{moles GnTMA} \times (\text{FW GnTMA-2(FW CO}_2))}$$

$$\text{moles GnTMA} = \frac{(\text{Integration of Si—CH}_3 \text{ hydrogens})}{6 \times (n+1)}$$

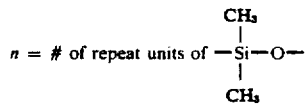

$n$ = # of repeat units of

FW PDMS block in GnTMA = [(74 × n) + 58

$$\text{moles PC} = \frac{\text{Integration of aryl hydrogens from BPA}}{8}$$

FW GnTMa = 464 + FW PDMS block in GnTMA

Preparation 1. (Polydiorganosiloxane G$_{28}$ TMA)

A dry 2 L four neck flask was fitted with a mechanical stirrer, a thermometer connected to a temperature control device, a stopper, and a condenser connected to a positive pressure of Argon. The reactor was charged with octamethylcyclotetrasiloxane (1042 g, 14.0 mole of dimethyl siloxane), aminopropylpolymethylsiloxane (General Electric Product Identification # 88849, FW =910 g/mole, 846 g, 0.93 mole), and 20 wt. % tetramethyl-ammonium hydroxide in methanol (9.5 g solution, 1.9 g. 0.21 mole Me$_4$NOH). The reaction was stirred for 19 hours at 80 C. The solution was raised to 160°C. for 1½ hours and vigorously sparged for 1½ hours. 1664 g of material was recovered.

A 3 L two neck flask was fitted with a mechanical stirrer and a Dean Stark trap which was connected to a condenser which was connected to positive pressure of Argon. The reactor was charged with (835.2 g, 0.47 mole) of the material produced above, trimelletic anhydride (181 g, 0.94 mole), and toluene (500 mL). The mixture was refluxed overnight with 17.2 ml of water removed. The toluene was removed via rotary evaporator (final conditions, 95°C., 2 torr). $^{29}$ Silicon NMR: +7.5 (s, 7.2 Si), −10.3(s,0.3 Si), −21.9 (m, 92.5 Si). These integration values indicate a PDMS block length of 28, i.e., in the formula $G_n$ TMA, n=28.

EXAMPLE 1

A blending of 5 parts by weight of the polydiorganosiloxane prepared in accordance with the procedure of Preparation 1, supra and a polycarbonate (PC) resin (Lexan®, a bisphenol-A homopolymer, I.V. of 1.2; dl/g; ML-4735, General Electric Company, Mount Vernon, Ind.). The polydiorganopolycarbonate was mixed in, using a Henschel mixer for 1 to 3 minutes. The mix was introduced into an extruder maintained at a temperature of 340.C. All extrusions were performed on a Werner-Pfleiderer ZSK30 corotating twin screw extruder with a 27:1 length/diameter ratio. A representative sample of the extrudate was tested for physical properties, which are reported in Table I, below. For comparative purposes the polycarbonate resin was also tested and the test findings are also set forth in the Table I.

EXAMPLE 2 (CONTROL EXAMPLE)

The procedure of Example 1, supra., was repeated except that a trimethylsiloxy-terminated siloxane fluid with a block length of 127 was extruded into the polycarbonate resin, at a 5 percent (w/w) level. The material could not be molded into test parts due to slipping of the pellets on the moving machine screw.

TABLE I

|  | Example 1 PC-Siloxane Graft Copolymer | Control Example PC (No Siloxane) |
|---|---|---|
| 125 mil N. Izod (J/M) | 888 | 888 |
| 250 mil N. Izod (J/M) | 715 | 170 |
| Tensile Strength (Mpa) | | |
| @ Yield | 573 | 613 |
| @ Break | 517 | 498 |
| % Elongation | 55 | 34 |
| Flow KI (csec) | 3620 | 22500 |
| % PMDS * Total | 4.3 | 0 |
| % PMDS (bound) | 4.3 | 0 |
| % PMDS (unbound) | 0 | 0 |
| Transparent | YES | YES |

*from H'NMR analysis

Table I shows that the PC-silicone graft copolymer has superior performance to the unmodified PC with improved thick section impact (250 mil N. Izod) and better tensile elongation. The copolymer also shows vastly improved flow vs the unmodified PC as measured by the Kasha Index.

A simple blend of silicone fluid in polycarbonate (Example 2) could not be injection molded into test parts. However, examination of the compounded pellets showed loss of transparency in comparison to the clear graft copolymer of Example 1.

The transparency of the extruded samples in comparison to blends of silicone with polycarbonate resin which are opaque indicates that the acid functionalized silicone chemically bonded to the polycarbonate during extrusion. The formation of polycarbonate-siloxane copolymer was confirmed by chemical analysis. A solution of melt grafted copolymer was prepared in methylene chloride and passed through a silica gel column. Proton NMR analysis showed no loss of siloxane. A solution of unreacted (i.e. not extruded) acid functionalized siloxane and polycarbonate was completely separated by the same procedure, thus demonstrating chemical bonding during the extrusion process.

What is claimed is:

1. A process of preparing a polycarbonate-silicone block copolymer, which comprises;
   melt-blending together
   (a) an aromatic polycarbonate resin; and
   (b) a polydiorganosiloxane having at least one functional carboxylic acid group and wherein the term organo means a monovalent radical selected from the group consisting of alkyl, halogen-substituted alkyl, alkenyl, and aryl.

2. The process of claim 1 wherein the polydiorganosiloxane is a trimelletic anhydride endcapped polydimethylsiloxane of formula:

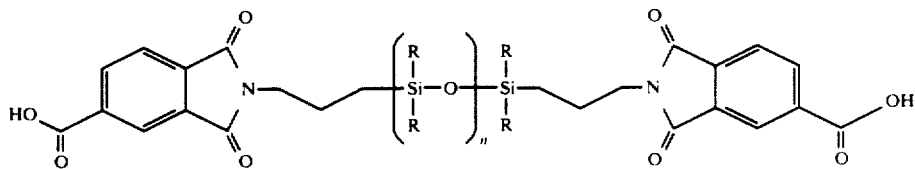

wherein n equals an integer of at least 1 up to about 1,000 and each R is methyl.

3. The process of claim 2 wherein n is from 4 to about 40.

4. A block copolymer of a polycarbonate reacted with a carboxy acid group functionalized polydiorganosiloxane.

5. The copolymer of claim 4 wherein about 1-10 wt. percent carboxy acid functionalized polydiorganosiloxane is reacted with about 90-99% weight percent aromatic polycarbonate, based on the weights of the polycarbonate and the diorganopolysiloxane.

6. The copolymer of claim 5 wherein the polycarbonate is bisphenol-A polycarbonate.

* * * * *

UNITED STATES PATENT AND TRADEMARK OFFICE
CERTIFICATE OF CORRECTION

PATENT NO. : 4,994,532

DATED : February 19, 1991

INVENTOR(S) : Christopher Michael Hawkins; Robert Russell Gallucci

Page 1 of 2

It is certified that error appears in the above-identified patent and that said Letters Patent is hereby corrected as shown below:

Column 3
Line 64
Delete "0"

Column 4
Line 36
Delete "(chloropeenyl)" and add "(chlorophenyl)"

Column 5
Line 13
Delete "difnnctional" and add "difunctional"

Column 6
Line 16
Delete "-silicpne" and add "-silicone"

Column 8
Line 18
Delete "300 C" and add "300°C"

Column 8
Line 58
Delete "80 C" and add "80°C"

UNITED STATES PATENT AND TRADEMARK OFFICE
CERTIFICATE OF CORRECTION

PATENT NO. : 4,994,532

DATED : February 19, 1991

INVENTOR(S) : Christopher Michael Hawkins; Robert Russell Gallucci

It is certified that error appears in the above-identified patent and that said Letters Patent is hereby corrected as shown below:

Column 9
Line 14
Delete "340.C" and add "340°C"

Signed and Sealed this

Twenty-fifth Day of August, 1992

Attest:

DOUGLAS B. COMER

Attesting Officer     Acting Commissioner of Patents and Trademarks